United States Patent
Zhou et al.

(10) Patent No.: US 12,463,747 B2
(45) Date of Patent: Nov. 4, 2025

(54) POLAR DECODER AND ASSOCIATED METHOD

(71) Applicant: The Royal Institution for the Advancement of Learning / McGill University, Montreal (CA)

(72) Inventors: Huayi Zhou, Montreal (CA); Ryan Meng Yong Seah, Montreal (CA); Marwan Jalaleddine, Montreal (CA); Warren Jeffrey Gross, Montreal (CA)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 0 days.

(21) Appl. No.: 18/734,486

(22) Filed: Jun. 5, 2024

(65) Prior Publication Data
US 2024/0405915 A1  Dec. 5, 2024

Related U.S. Application Data

(60) Provisional application No. 63/506,252, filed on Jun. 5, 2023.

(51) Int. Cl.
*H03M 13/00* (2006.01)
*H03M 13/29* (2006.01)
*H04L 1/00* (2006.01)

(52) U.S. Cl.
CPC ...... *H04L 1/0057* (2013.01); *H03M 13/2927* (2013.01)

(58) Field of Classification Search
CPC ............... H04L 1/0057; H04L 1/0045; H03M 13/2927; H03M 13/09
See application file for complete search history.

(56) References Cited

U.S. PATENT DOCUMENTS

| | | | |
|---|---|---|---|
| 6,606,726 B1 * | 8/2003 | Wilhelmsson | H03M 13/00 |
| 9,007,241 B2 * | 4/2015 | Alhussien | H03M 13/611 |
| | | | 714/755 |
| 9,317,365 B2 * | 4/2016 | Alhussien | G06F 11/1076 |
| 10,382,067 B2 * | 8/2019 | Sharon | G06F 11/1012 |
| 10,439,808 B2 * | 10/2019 | Alleaume | H04L 9/0852 |
| 10,938,421 B2 * | 3/2021 | Sharon | H03M 13/1111 |
| 11,463,114 B2 * | 10/2022 | Koike-Akino | H03M 13/116 |

(Continued)

*Primary Examiner* — Esaw T Abraham
(74) *Attorney, Agent, or Firm* — Blank Rome LLP

(57) ABSTRACT

An optimization-based decoder with improved performance and cyclic redundancy check is provided. An optimization problem is generated and solved. The optimization problem includes a function implementing constraints on variables. Main variables correspond to nodes of the encoding graph, including input variables corresponding to output nodes and output variables corresponding to input nodes. Ancillary variables correspond to an additional output a logical operations in the encoding graph. Constraints are configured to generate cost penalties, for instance when the main and ancillary variables of a candidate solution disagree with conditions of the encoding graph, and to correspond with the cross-entropy between each codeword symbol and the corresponding input variable. A candidate solution is obtained by solving the optimization problem, wherein the output variables in the candidate solution correspond to decoded symbols.

20 Claims, 11 Drawing Sheets

(56) References Cited

U.S. PATENT DOCUMENTS

| | | | |
|---|---|---|---|
| 11,941,489 B2* | 3/2024 | Jamieson | H03M 13/1111 |
| 11,948,047 B2* | 4/2024 | Chiani | H03M 13/611 |
| 2015/0229337 A1* | 8/2015 | Alhussien | H03M 13/35 |
| | | | 714/773 |
| 2018/0227076 A1* | 8/2018 | Koike-Akino | H03M 13/353 |

* cited by examiner

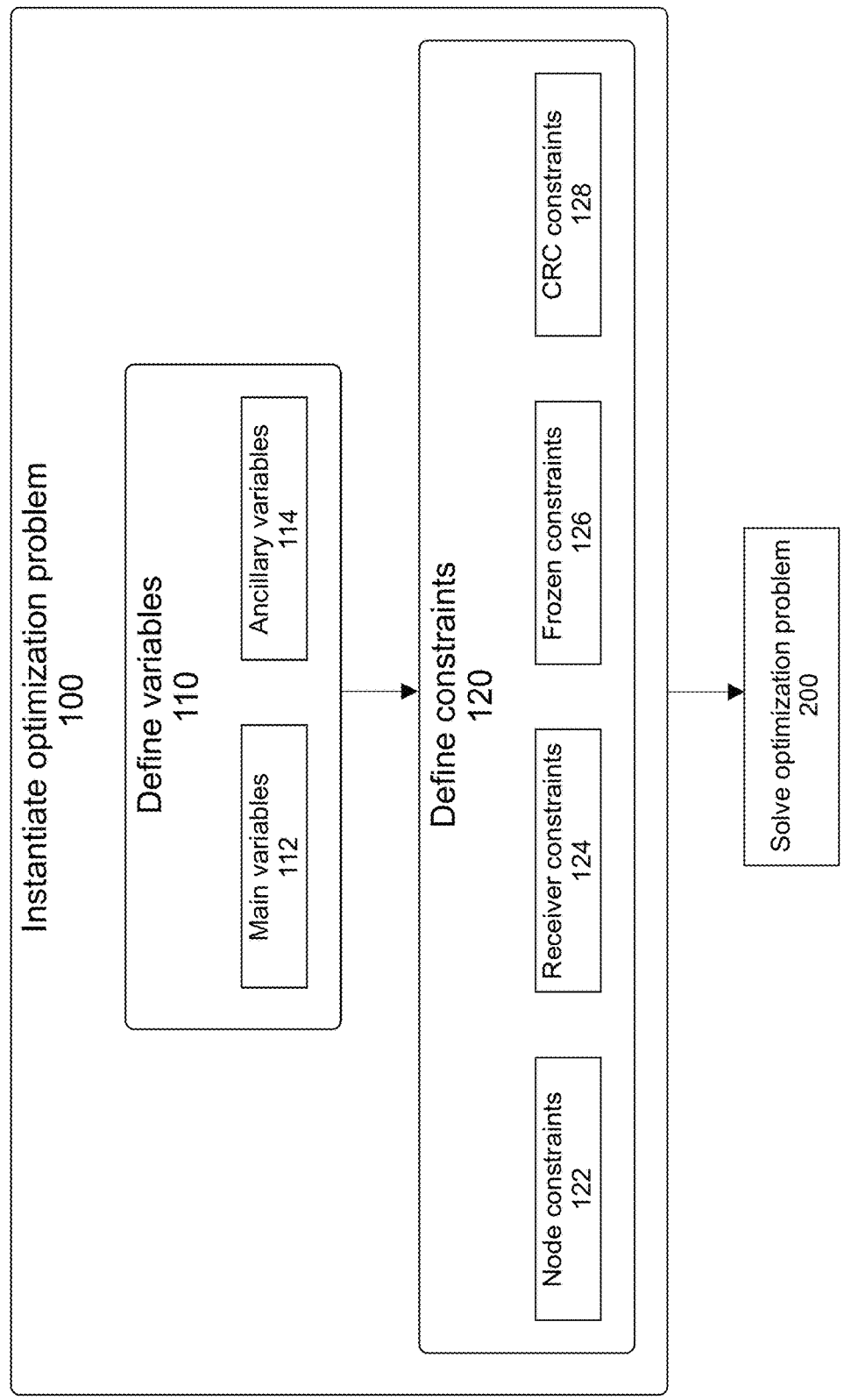

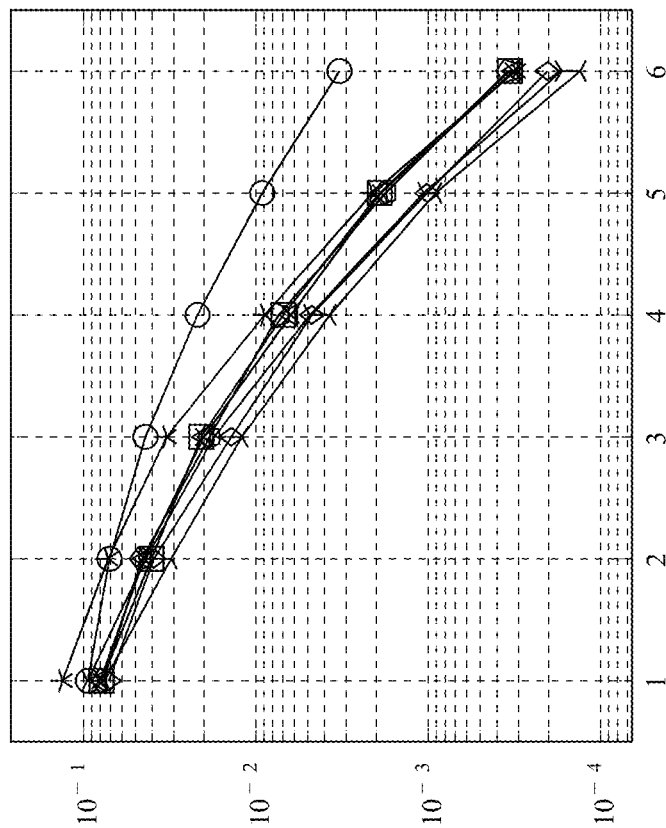
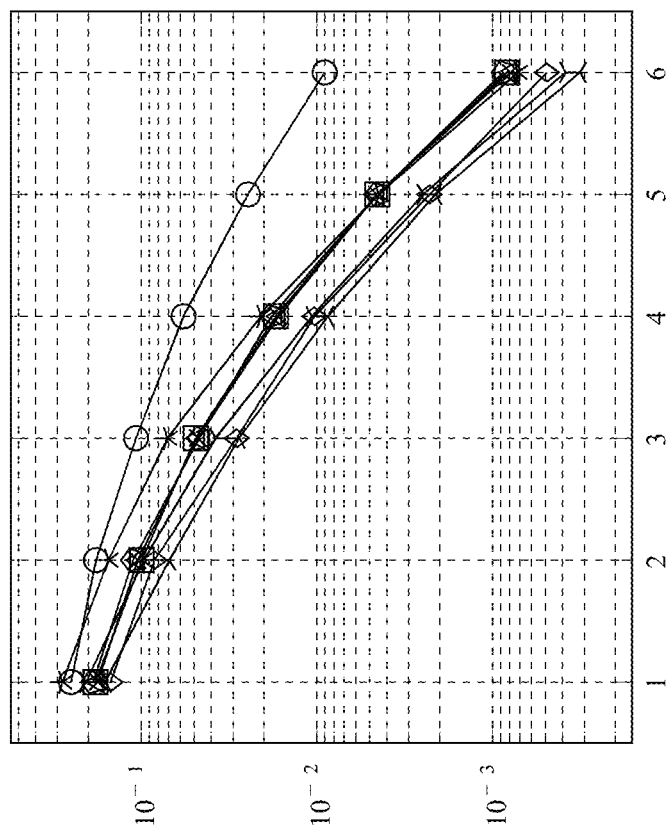
FIG. 5A
FIG. 5B

POLAR DECODER AND ASSOCIATED METHOD

CROSS-REFERENCE TO RELATED PATENT APPLICATION

This application claims the benefit of, and priority to, U.S. Provisional Patent Application No. 63/506,252, filed 5 Jun. 2023, and entitled "Polar Decoder and Associated Method", the disclosure of which is hereby incorporated by reference in its entirety.

TECHNICAL FIELD

The technical field relates to error-correcting codes, and more specifically to systems and methods for decoding noisy codewords that have been transmitted through noisy channels.

BACKGROUND

Polar codes are error-correcting codes that can be proved to achieve channel capacity with low-complexity encoding and decoding algorithms. They have been selected as the standard control channel codes in the 5th generation mobile communication (5G) systems.

The research of efficient polar decoding algorithms has become a hotspot for future communication systems. Although successive cancellation (SC) decoding only requires a computational complexity of $O(N \log_2 N)$, the corresponding error-correction performance cannot be ensured to reach the maximum likelihood (ML) bound. SC list (SCL) decoding could improve performance using a list structure to keep the candidates. While cyclic redundancy check (CRC) aided SCL (CA-SCL) decoders could further improve the performance of certain codes, SCL brings extra complexity caused by the sort and copy operations of the candidates at each step, which requires more resources and latency.

Heuristic algorithms can be viewed as an alternative to traditional algorithms in solving communication latency problems. Once an objective function is designed for a communication optimization problem, the optimal solution can be searched by metaheuristic algorithms, such as simulated annealing (SA) and quantum annealing (QA). SA mimics the process of annealing in metallurgy to reach a sufficiently low temperature as the solution.

QA is a quantum technique used to solve optimization problems, which leverages quantum mechanics to search for the optimal solution among numerous possibilities efficiently. QA for multiple-input-multiple-output detection based on sphere decoding has been proposed where the ML detection problem was transformed into the quadratic unconstrained binary optimization (QUBO) form which was solved by a quantum annealer. The QA belief propagation (BP) decoder has been proposed for low-density parity-check codes (LDPC). A hybrid classical-QA polar decoder (HyPD) was proposed in S. Kasi, J. Kaewell, and K. Jamieson, "The design and implementation of a hybrid classical-quantum annealing polar decoder," in Proc. IEEE Global Communications Conference (GLOBECOM), 2022, pp. 5819-5825 (hereafter "Kasi et al."), the entirety of which is incorporated herein by reference. HyPD was implemented on a multipath Rayleigh fading channel and is limited to codes of length 8; with longer codes showing poor performance.

Current QA polar decoders face at least the following challenges. First, based on the current cost function, solving sub-blocks with sizes greater than 8 bits leads to poor performance. Using SA to decode a codeword of length 16 bits in the additive white Gaussian noise (AWGN) channel, the poor performance can be observed. Second, current QA polar decoders have not contemplated some manners of simplifying the cost function. Third, CRC bits are usually utilized to further improve the error-correction performance, however utilizing such bits has not been proposed in the art.

There remains, therefore, a need for an optimization-based decoder with a better performing cost function that can handle CRC.

SUMMARY

In accordance with an aspect, a method for decoding a noisy codeword is provided. The noisy codeword includes a plurality of codeword symbols corresponding to a plurality of input symbols encoded via an encoder and transmitted via a noisy channel. The method includes generating an optimization problem including an objective function, the objective function being evaluated according to variables of candidate solutions, said variables including: a plurality of main variables, each corresponding to one of a plurality of nodes in an encoding graph implemented by the encoder, said main variables including input variables at output nodes of the encoding graph and output variables at input nodes of the encoding graph, and a plurality of ancillary variables, each corresponding to an additional output of one of a plurality of logical operations in the encoding graph, wherein the objective function includes an aggregation of constraints, the constraints including: node constraints configured to generate a first cost penalty when the main and ancillary variables of a candidate solution disagree with conditions of the encoding graph implemented by the encoder, and receiver constraints configured to generate a second cost penalty corresponding to a cross-entropy between each codeword symbol and a corresponding one of the input variables; and solving the optimization problem to obtain a candidate solution, wherein the output variables in the candidate solution correspond to decoded symbols.

In accordance with another aspect, there is provided a system for decoding a noisy codeword. The system includes a receiver configured for receiving the noisy codeword, wherein the noisy codeword includes a plurality of codeword symbols corresponding to a plurality of input symbols encoded via an encoder and transmitted via a noisy channel; memory for storing variable values; and a decoder including: an objective function creation module configured to: generate an optimization problem including an objective function, the objective function being evaluated according to variables of candidate solutions, said variables including: a plurality of main variables, each corresponding to one of a plurality of nodes in an encoding graph implemented by the encoder, said main variables including input variables at output nodes of the encoding graph and output variables at input nodes of the encoding graph, and a plurality of ancillary variables, each corresponding to an additional output of one of a plurality of logical operations in the encoding graph, wherein the objective function includes an aggregation of constraints, the constraints including: node constraints configured to generate a first cost penalty when the main and ancillary variables of a candidate solution disagree with conditions of the encoding graph implemented by the encoder, and receiver constraints configured to generate a second cost penalty corresponding to a cross-entropy between each codeword symbol and a corresponding one of the input variables; and a solver configured for solving the optimization problem to obtain a candidate solution, wherein the output variables in the candidate solution correspond to decoded symbols.

In accordance with a further aspect, a non-transitory computer-readable medium storing thereon computer executable instructions for decoding a noisy codeword is provided. The noisy codeword includes a plurality of codeword symbols corresponding to a plurality of input symbols encoded via an encoder and transmitted via a noisy channel. The instructions, when executed by one or more processors of a computing system, cause the computing system to: generate an optimization problem including an objective function, the objective function being evaluated according to variables of candidate solutions, said variables including: a plurality of main variables, each corresponding to one of a plurality of nodes in an encoding graph implemented by the encoder, said main variables including input variables at output nodes of the encoding graph and output variables at input nodes of the encoding graph, and a plurality of ancillary variables, each corresponding to an additional output of one of a plurality of logical operations in the encoding graph, wherein the objective function includes an aggregation of constraints, the constraints including: node constraints configured to generate a first cost penalty when the main and ancillary variables of a candidate solution disagree with conditions of the encoding graph implemented by the encoder, and receiver constraints configured to generate a second cost penalty corresponding to a cross-entropy between each codeword symbol and a corresponding one of the input variables; and solve the optimization problem to obtain a candidate solution, wherein the output variables in the candidate solution correspond to decoded symbols.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

FIG. 1 is a flowchart illustrating a method for decoding a noisy codeword, according to an embodiment.

FIGS. 5A and 5B show a comparison of the frame error and bit error rates on a specific codeword size according to different embodiments and baselines.

DETAILED DESCRIPTION

Figure 2A:
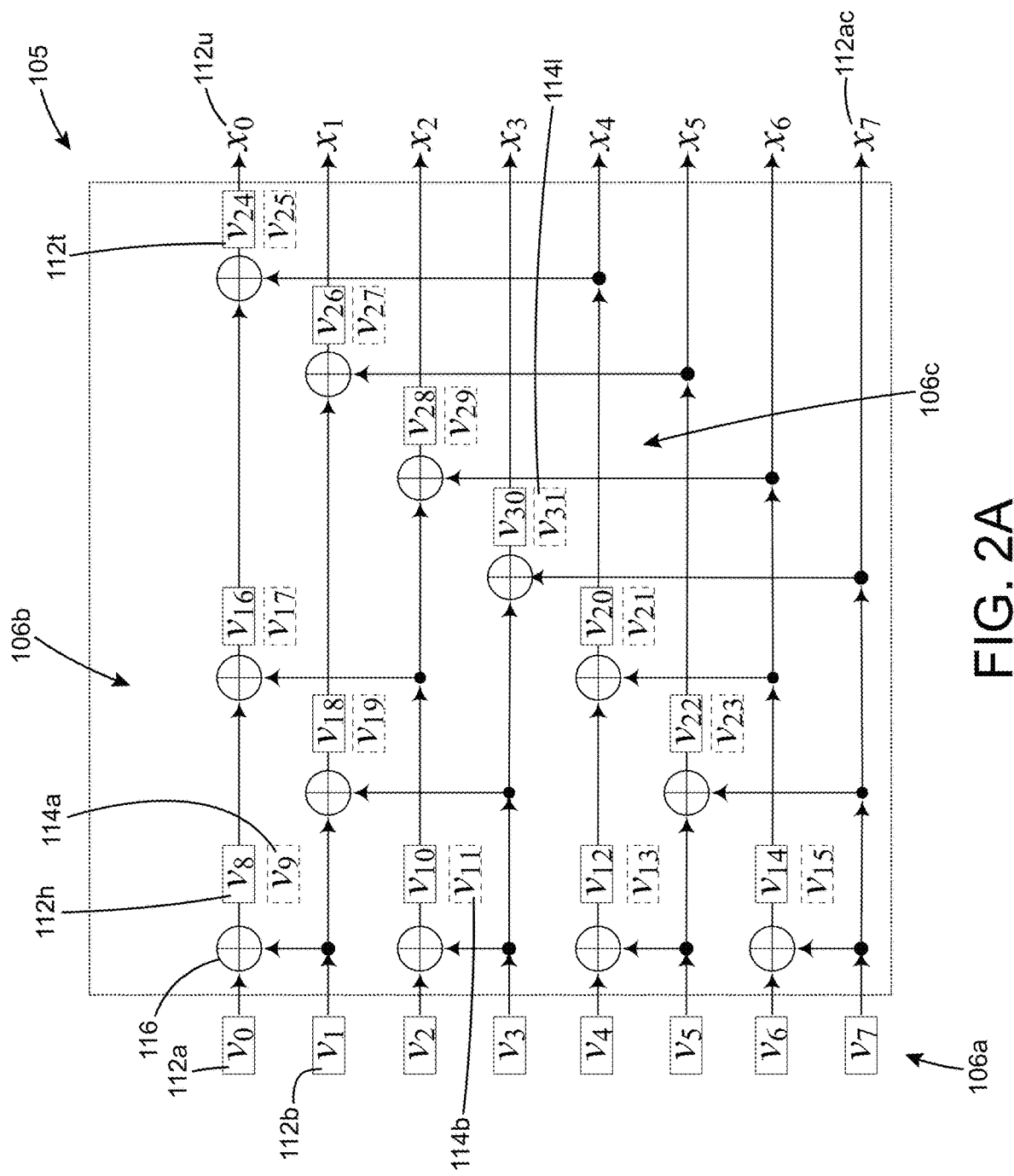
FIGS. 2A and 2B illustrate encoding graphs used to instantiate an optimization problem according to two alternative embodiments.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practised without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

One or more systems described herein may be implemented in computer program(s) executed on processing device(s), each comprising at least one processor, a data storage system (including volatile and/or non-volatile memory and/or storage elements), and optionally at least one input and/or output device. "Processing devices" encompass computers, servers and/or specialized electronic devices which receive, process and/or transmit data. As an example, "processing devices" can include processing means, such as microcontrollers, microprocessors, and/or CPUs, or be implemented on FPGAs. For example, and without limitation, a processing device may be a programmable logic unit, a mainframe computer, a server, a personal computer, a cloud based program or system, a laptop, a personal data assistant, a cellular telephone, a smartphone, a wearable device, a tablet, a video game console or a portable video game device.

Each program is preferably implemented in a high-level programming and/or scripting language, for instance an imperative e.g., procedural or object-oriented, or a declarative e.g., functional or logic, language, to communicate with a computer system. However, a program can be implemented in assembly or machine language if desired. In any case, the language may be a compiled or an interpreted language. Each such computer program is preferably stored on a storage media or a device readable by a general or special purpose programmable computer for configuring and operating the computer when the storage media or device is read by the computer to perform the procedures described herein. In some embodiments, the system may be embedded within an operating system running on the programmable computer.

Furthermore, the system, processes and methods of the described embodiments are capable of being distributed in a computer program product comprising a computer readable medium that bears computer-usable instructions for one or more processors. The computer-usable instructions may also be in various forms including compiled and non-compiled code.

The processor(s) are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, diskettes, compact disks, tapes, chips, as examples only. The type of memory is of course chosen according to the desired use, whether it should retain instructions, or temporarily store, retain or update data. Steps of the proposed method are implemented as software instructions and algorithms, stored in computer memory and executed by processors.

With reference to FIG. 1, an exemplary method 1 for decoding a noisy codeword is shown. The noisy codeword can include a plurality of codeword symbols corresponding to a plurality of input symbols that were first encoded via an encoder, then transmitted via a noisy channel. In the present specification, unless otherwise specified, the word "channel" is used in its information theory sense, e.g., to refer to a communication medium that can be represented via different models, such as an additive white Gaussian noise (AWGN) channel. The word "symbol" is defined to include any member of the information theory input and/or output alphabet of the noisy channel. In the context of a binary noisy channel, the alphabets are defined as {0, 1}, and "symbols" can alternatively be designated as "bits".

In the present exemplary embodiment, the encoder used to generate the codeword is a polar encoder, although it is appreciated that the method can be applied to decode codewords generated using other types of encoders, such as a Reed-Muller encoder or other encoders associated with error correction codes. Moreover, in the illustrated embodiment, the input symbols include cyclic redundancy check (CRC) symbols (e.g., generated using a CRC encoder), although it is appreciated that the method can apply to codewords generated without CRC symbols. Finally, in the present exemplary embodiment, the codeword is subject to binary phase-shift keying (BPSK) modulation and transmitted over an AWGN channel, although it is appreciated that the method can be applied to other modulations and other types of channels.

In the present description, input symbols, or input bits, are defined as the symbols received by and used as input to the encoder. They can include information symbols or bits, corresponding to a message to be transmitted, frozen symbols or bits, corresponding to uninformative symbols or bits, for instance symbols or bits transmitted over a lower capacity subchannel by a polar encoder, and CRC symbols or bits, corresponding to a check value redundant with, e.g., the information symbols or bits, or the information and frozen symbols or bits.

As shown in FIG. 1, the method 1 generally includes instantiating 100 and solving 200 an optimization problem, the variables of which, once optimized, correspond to decoded bits or symbols.

With K representing the number of information bits, and with m representing the number of CRC bits used (i.e., there is no CRC bit for m=0), if m>0, the K information bits are first fed into a CRC encoder to output K+m bits. An information set $\mathbb{A}$, which contains the K+m most reliable positions in $u_0^{N-1}$ can be chosen to place these K+m bits, where $u_0^{N-1}=(u^0, u_1, \ldots, u_{N-1})$ is denoted as the information vector and $N=2^n$. $\mathbb{A}^C$ denotes the complement of $\mathbb{A}$ on $0, 1, \ldots, N-1$, which consists of the remaining N−K−m bits, called frozen bits, that can have a predetermined value, such as 0. The information bits $u_0^{N-1}$ can then be encoded by, e.g., a polar encoder and generate the encoded vector $x_0^{N-1}=(x^0, x, \ldots, x_{N-1})$, $$x_0^{N-1} = u_0^{N-1} G_N = u_0^{N-1} F^{\otimes n}$$

where $G_N$ is the generator matrix of size N. $F^{\otimes n}$ is generated by calculating the n'th Kronecker product of the polarizing matrix $$F = \begin{bmatrix} 1 & 0 \\ 1 & 1 \end{bmatrix}.$$

The polar code can be represented as P(N, K, m). In this case, the code rate R is defined as R=K/N.

In exemplary method 1, the modulation is binary phase-shift keying (BPSK) and the channel is the additive white Gaussian noise (AWGN) channel.

The encoded bits $x_0^{N-1} \in \{0, 1\}^N$ can be mapped to $s_0^{N-1} \in \{0,-1\}^N$ via $s_0^{N-1}=1-2x_0^{N-1}$. The received vector is $y_0^{N-1}$, which can be represented as:

$$y_0^{N-1} = s_0^{N-1} + w_0^{N-1}$$

where $w_0^{N-1}$ is the noise vector with mean 0 and variance $\sigma^2$.

Decoding can be represented in the form of an optimization problem, such as a quadratic unconstrained binary optimization (QUBO) function. A QUBO function is described as:

$$H_{QUBO} = \sum_{i=0}^{T-1}\sum_{j=0}^{T-1} Q_{ij} v_i v_j$$

where $v_i \in \{0, 1\}$. $Q_{ij}$ are coefficients that are used to penalize or reward a solution. T is the total number of variables. Note that the QUBO function can be equivalent to the Ising model. Therefore, the optimization function can be solved, e.g., using a quantum annealing (QA) device.

At step 100, an optimization problem such as a QUBO is instantiated by defining a set of variables 110 and a set of constraints 120. The constraints 120 are aggregated in an objective function, or cost function. In some embodiments, the objective function is designed such that a value deemed optimal for the variables corresponds to the result of the objective function being minimized. In some embodiments, the objective function is designed to be maximized. In the present specification, the expressions "objective function" and "cost function" are used indistinctly.

HyPD proposes separating the decoding tree into upper layers and lower layers (sub-blocks). It utilizes SC decoding for the upper layers and QA decoding for the sub-blocks. In each sub-block, a cost function that can be transformed into the QUBO form is designed for the polar decoding on a short length.

An example of an encoding graph 105 on P(8, 4, 0) is shown in FIG. 2A. The encoding graph includes input nodes 106a corresponding to nodes where input symbols are provided to the encoder, intermediate nodes 106b corresponding to results of intermediate logical operations 116 performed by the encoder, and output nodes 106c corresponding to nodes where an output of the encoder is produced (i.e. the resulting codeword).

With reference to both FIGS. 1 and 2, a total of T variables are instantiated. The set of variables comprises two parts: all the nodes in the encoding graph 105 which can be referred to as main variables 112, 112a-112ac (i.e., $v_0$-$v_8$, $v_{10}$, $v_{12}$, $v_{14}$, $v_{16}$, $v_{18}$, $v_{20}$, $v_{22}$, $v_{24}$, $v_{26}$, $v_{28}$ and $v_{30}$); and additional ancillary variables 144, 114a-1141 (i.e., $v_9$, $v_{11}$, $v_{13}$, $v_{15}$, $v_{17}$, $v_{19}$, $v_{21}$, $v_{23}$, $v_{25}$, $v_{27}$ and $v_{29}$)—each logical operation 116 (such as XOR) needs one ancillary variable to represent an additional output. The main variables can include input variables corresponding to variables used as input of the decoder. Such input variables can be viewed as being positioned at the output nodes 106c of the encoding graph (i.e., $v_{24}$, $v_{26}$, $v_{28}$, $v_{30}$, $v_{20}$, $v_{22}$, $v_{14}$ and $v_7$). The main variables can also include output variables corresponding to variables at the output of the decoder. Such output variables can be viewed as being positioned at the input nodes 106*a* of the encoding graph (i.e. $v_0$-$v_7$).

Let T be the set of nodes in the encoding graph 105 implemented by the encoder, e.g., the polar encoder. The solution can be $$\arg\min_{v_0^{T-1}}\{f(v_0^{T-1})\},$$

where $f(v_0^{T-1})$ is the objective function to be minimized:

$$f(v_0^{T-1}) = W_N \sum_{P \in T} C_N(P) + W_F \sum_{\forall v_i \in \mathbb{A}^C} C_F(v_i) + W_R \sum_{\forall j} C_R(x_j)$$

which comprises three kinds of constraints: node constraints ($C_N$) 122, frozen constraints ($C_F$) 126, and receiver constraints (CR) 124. The node constraints 122 represent all the XOR operations 116 in the encoding graph 105. The frozen constraints 126 ensure all the frozen bits have the predetermined value, e.g., zero. The receiver constraints 124 represent the distance between encoded bits $x_0^{N-1}$ and the noisy version received after transmission via a noisy channel and used as input bits to the decoder. A cost penalty can be introduced to the overall objective function if the constraints are violated. Constraints of the different types are aggregated, for instance by weighted or unweighted summation, to create the objective function. In the equation shown above, the weights $W_N$, $W_F$ and $W_R$ determine the importance of the corresponding constraints 122-126. As an example, the following weights can be used: $W_N=1$, $W_F=4$, $W_R=2-R$.

If $\varepsilon_p$ is the set of all XOR operations performed at node P, the node constraints 122 can be defined as:

$$C_N = \sum_{\forall XOR(v_i, v_j) \in P} (v_i + v_j - v_k - 2v_{k+1})^2$$

where $v_{k+1}$ is an ancillary variable. In this form, if $C_N(T)$ could reach the minimum value (i.e., $C_N(T)=0$), the sum $v_i+v_j$ must be equal to the sum $v_k+2v_{k+1}$. This models the XOR operation of $v_i$ and $v_j$, $v_k=v_i \oplus v_j$. It can be appreciated that, while XOR operations are commonly used for encoding and decoding on binary channels, different types of logical operations can additionally or alternatively be used, in particular when the channel alphabet has more than two symbols.

The frozen constraints 126 can be defined as:

$$C_F(v_i) = v_i$$

where $C_F$ is minimal when all the frozen bits are equal to the predetermined value, e.g., zero.

The receiver constraints 124 can be defined as the probability that $x_i$ should be a one value over an AWGN channel with the BPSK modulation based on the received $y_i$, which is:

$$Pr(x_i = 1 \mid y_i) = \frac{1}{1 + \exp\left(\frac{2y_i}{\sigma^2}\right)}$$

The distance metric can be defined as:

$$C_R(x_i) = (x_i - Pr(x_i = 1 \mid y_i))^2$$

where $x_i$ could be denoted by a $v_j$ in the encoding graph 105. This constraint ensures that the codeword does not deviate too much from the received noisy version. Since there are $\log_2 N$ stages in the encoding graph 105, each stage has N/2 XOR operations 116. Each XOR operation 116 produces two variables 112, 114 as the output. Counting N input variables, a total of N+N× $\log_2 N$ variables are needed in the scheme. As an example, in FIG. 2A, there is a total of 32 variables with N=8. It can be appreciated that, as with node constraints 122, other types of logical operations in addition or alternatively to XOR operations can be used.

The constraints 120 as defined above may present some problems. First, based on the current cost function, solving sub-blocks with a size greater than 8 bits can lead to a poor computational performance. This can be caused by the rigidity of the distance metric function used in the receiver constraints 124, which prevents the optimizer from escaping a local minimum. Second, the frozen constraints 126 as defined cause redundancy, which adds computational complexity. Since all the frozen bits are set as variables, the cost function can be simplified. Third, CRC bits are usually utilized to further improve the error-correction performance. However, no way of adding CRC constraints to a QUBO objective function has been suggested in the prior art.

To solve these challenges, the present disclosure presents embodiments with different features, which are presented in more details below: replacing the distance metric function with a binary cross-entropy (BCE) loss function, yielding a cross-entropy SA (XSA) decoder that can achieve a near maximum likelihood performance; removing the frozen constraints to reduce the number of the required variables, yielding a simplified XSA (SXSA) decoder; and representing CRC with any polynomial in XOR operations which can then be transformed into CRC constraints 128, e.g., in the QUBO form, yielding a CRC-aided SXSA (CA-SXSA) decoder to further improve the error-correction performance.

In some embodiments, the receiver constraints 128 can be based on a suitable cross-entropy metric such as the binary cross-entropy. As an example, the receiver constraints can therefore be redefined as:

$$C_R(v_i) = -v_i \log Pr(v_i = 1 \mid y_i) - 1(1 - v_i)\log Pr(v_i = 0 \mid y_i)$$

In some embodiments, a base-2 logarithm is used. Similar to the distance metric, the BCE function is minimized when $v_i \in \{0, 1\}$ has a greater probability of being close to $y_i$.

Figure 3:
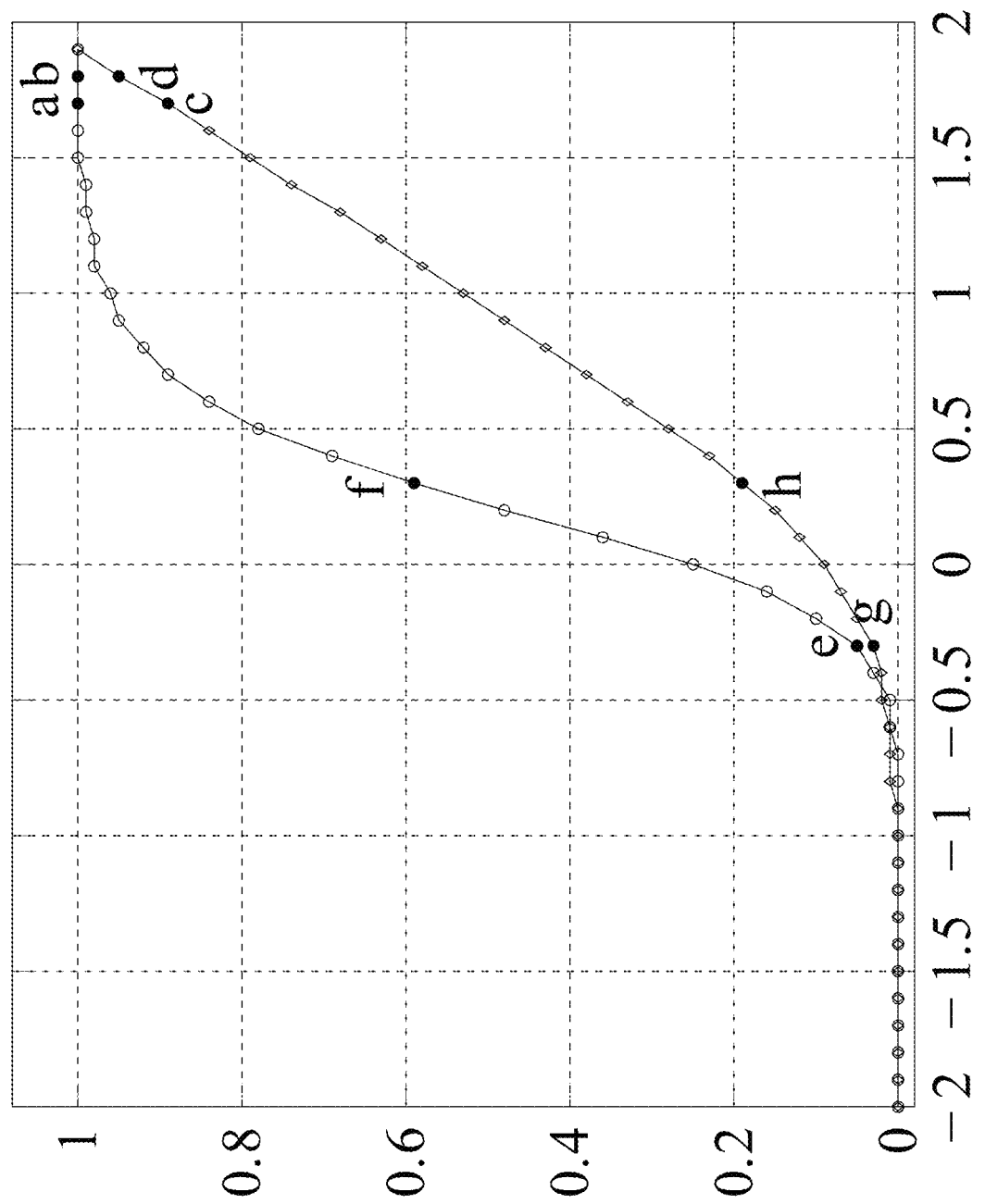
FIG. 3 shows a comparison of the normalized cost introduced by cost functions according to two alternative embodiments.

The comparison of the normalized cost introduced by the two functions based on the received $y_i$ in [−2, 2] with $\sigma^2$=0.5 is shown in FIG. 3 (distance metric with circle markers, binary cross entropy with diamond markers). Assuming the corresponding encoded bit is 1, then the correct transmitted symbol is −1 through BPSK modulation. Three observations can be made from FIG. 3.

First, if $y_i$ approaches −∞, then $\Pr(x_i=1|y_i)$ approaches 1, which can indicate that the received symbol approaches the correct symbol −1. In this case, the cost should approach 0. Both the distance metric and BCE have this characteristic.

Second, if $y_i$ approaches +∞, then $\Pr(x_i=1|y_i)$ approaches 0, which can indicate that the received symbol approaches the wrong symbol 1. In this case, the cost should approach too to provide a strong penalty. BCE function could match this point. However, the maximum cost of the distance metric is fixed and equal to 1. This point also indicates that there is no way to normalize these two functions in an unlimited range. The normalization in FIG. 3 is to divide the maximum value of both functions in the range of [−2, 2]. Note that moving from point a(c) to point b(d), the probability to be the wrong symbol (i.e., $\Pr(x_i=0|y_i)$) grows from being relatively close to 1 to being very close to 1, the BCE function provides a rapidly growing cost due to the log function curve, which makes sense since the cost (penalty) should grow rapidly if the received symbol becomes very close to the wrong symbol. However, the distance metric fails to provide this characteristic.

Third, consider the noise power is sufficiently large and we have to flip the bit to obtain the correct symbol based on $y_i$. Assuming the received $y_i$ leads to point e and point g in distance metric and BCE functions, respectively, the correct symbol is 1. Flipping e to f will obtain a higher cost than flipping g to h. Therefore, the BCE function has a smaller cost than the distance metric function, which provides a higher chance to flip the bit. Using the original distance metric can lead easily to remaining stuck in a local minimum and can limit the search space of the decoder as the noise power is sufficiently large, leading to a poor performance. Therefore, the BCE is more suitable to define the receiver constraints 124 than the cost function defined in the art.

In some embodiments, the cost function can be simplified by removing all the frozen variables. In existing methods, the cost function uses frozen constraints 126 to ensure that all the frozen bits are set to a predetermined value, e.g., zero. However, by removing the variables 112 corresponding to frozen bits, it is possible to remove the frozen constraints 126. The cost function can therefore be simplified to:

$$f(v_0^{T-1}) = W_N \sum_{P \in T} C_N(P) + W_R \sum_{\forall j} C_R(x_j)$$

In some embodiments, some main and ancillary variables 112, 114 at intermediate layers in this encoding graph 105 can also be removed. The reduction of the variables depends on the code rate. The lower rate is, the more variables could be saved. For instance, the main and ancillary variable attached to a XOR operation 116 can be removed if it is uninformative. An XOR operation and therefore the corresponding node 116 in the encoding graph 105 can be considered uninformative in two situations. This is easily seen when the predetermined value for frozen variables is zero. First, if both variables concerned by the XOR operation are frozen, i.e., they are equal to zero, the result of the XOR operation will be the same value, i.e., zero. Second, if the first variable concerned by the XOR operation is frozen, i.e. it is equal to zero, and the second variable is not, the result of the XOR operation will be the value of the second variable.

Figure 2B:
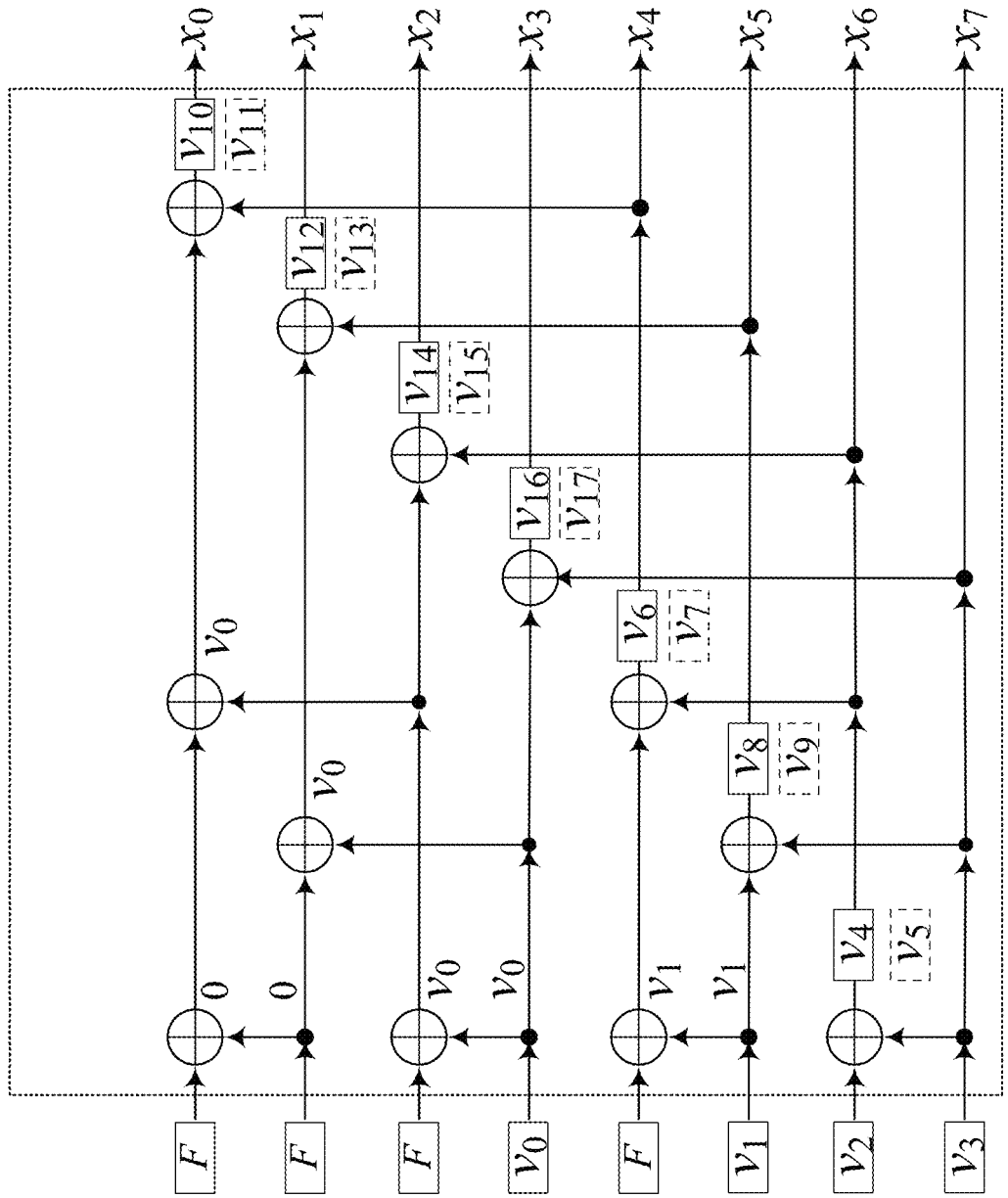

FIG. 2B presents the encoding graph 105 implemented by the same polar encoder P(8, 4, 0) as the encoding graph of FIG. 2A, with variables associated with frozen bits and uninformative nodes removed. As can be seen, only 18 variables 110 are necessary instead of 32. The reduction in variables not only requires fewer computational resources, but it leads the optimizer algorithm to flip the "right" variables, since it is not uselessly attempting to flip frozen variables, which may also bring an error-correction performance gain if the number of SA trials is not large enough.

In some embodiments, to further improve the error-correction performance, CRC with any polynomials can be transformed in CRC constraints 128, such as QUBO constraints. The CRC can be transformed in a constraint in two stages: first by representing CRC detection in XOR equations; and second by transforming the XOR equations into constraints.

In the first stage, XOR equations $r_0^{K+m-1}$ can be obtained from the input bits $v_0^{K+m-1}$ and the CRC divisor $d_0^m$ by first initializing $r_0^{K+m-1}$ to $v_0^{K+m-1}$, then, for each combination of values i between 0 and K−1 and j between 1 and m, if $d_j$ is 1, assigning to $r_{i+j}$ the value $r_{i+j} \oplus r_i$. Note that $r_i$ is always 0 when i<K. If $r_i$ is 0 for K≤i<K+m, then $v_0^{K+m-1}$ could pass the CRC.

Figure 7:
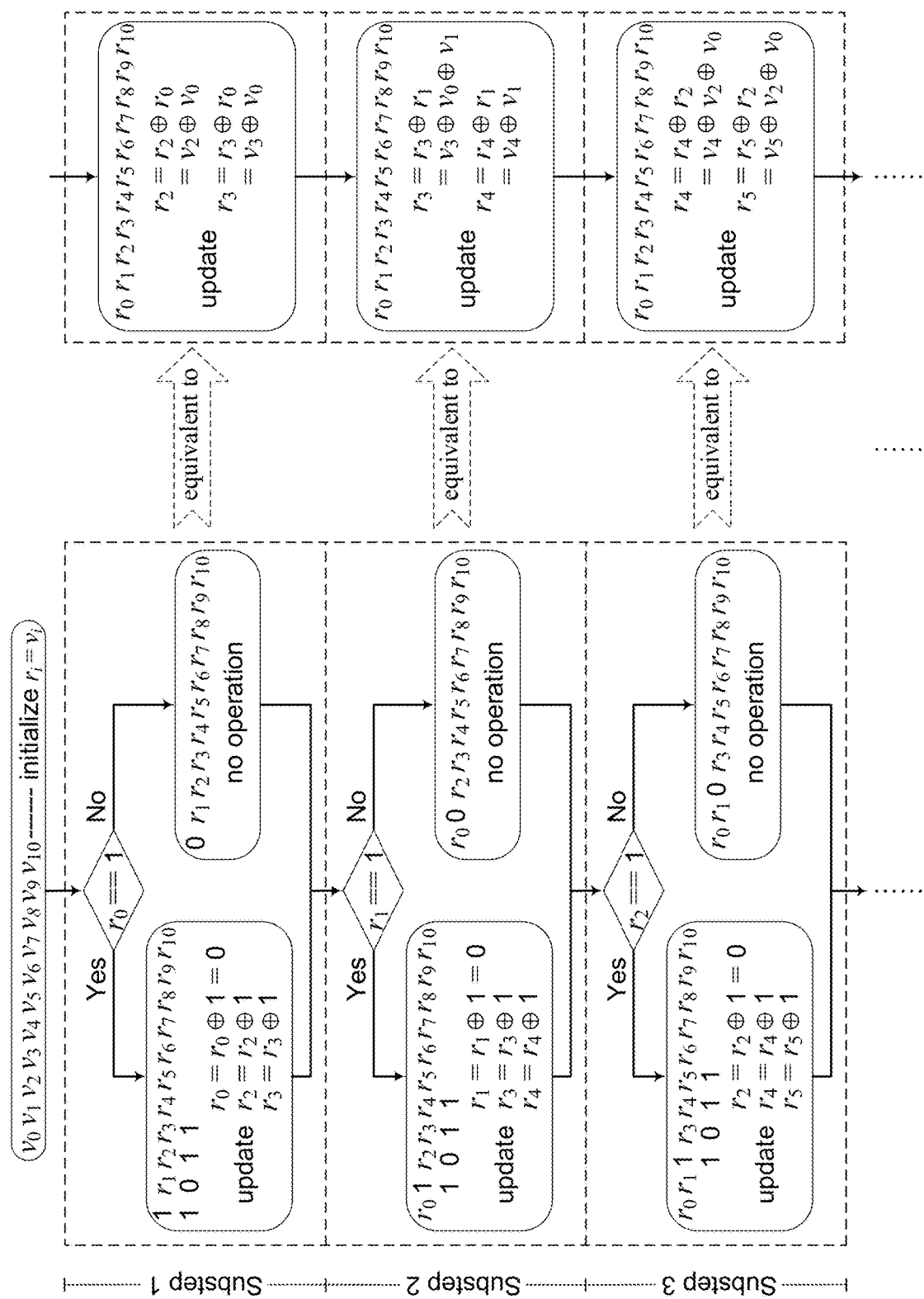
FIG. 7 is a flowchart illustrating an exemplary method of using XOR equations to represent CRC detection.

An example of using XOR equations to represent CRC detection with the divisor 1011 on an 11-bits sequence is shown in FIG. 7. Assuming $v_0^{K+m-1}$ is the input sequence that need to be checked, $r_i=v_i$ is initialized for 0≤i<K+m. Substep 1 includes checking the value of $r_0$. If $r_0$ is 1, the divisor 1011 is put below $r_0r_1r_2r_3$. In this case, $r_i$ will be updated as: $r_0=r_0 \oplus 1=0$, $r_2=r_2 \oplus 1$, $r_3=r_3 \oplus 1$. Otherwise, if the previous $r_0$ is 0, no operation is needed. The above operation in substep 1 is equivalent to update $r_i$ as: $r_2=r_2 \oplus r_0=v_2 \oplus v_0$, $r_3=r_3 \oplus r_0=v_3 \oplus v_0$. In this form, the check on $r_0$ can be represented in XOR equations. In substep 2, if $r_1$ is 1, $r_1$ is updated: $r_1=r_1 \oplus 1=0$, $r_3=r_3 \oplus 1$, $r_4=r_4 \oplus 1$. No operation is needed if $r_1$ is 0. Similarly, $r_3=r_3 \oplus r_1=r_3 \oplus v_0 \oplus v_1$, $r_4=r_4 \oplus r_1=v_4 \oplus v_1$ can be used to perform substep 2, and so on. After substep K (in the example, K=8) is performed, the final remainder $r_0^{10}$ can be indicated in XOR equations of $v_1$.

A general method for representing CRC detection in XOR equations can use the algorithm listed below, which uses a dual-loop to obtain the final remainder in the XOR form:

```
Algorithm - Represent CRC detection in XOR equations

Input:  v_0^{K+m-1}, d_0^m
Output: r_0^{K+m-1}
1:                      r_0^{K+m-1} ← v_0^{K+m-1}
2:                      for i = 0 → K − 1 do
3:                          for j = 0 → m do
4:                              if d_j == 1 then
5:                                  r_{i+j} ← r_{i+j} ⊕ r_i
6:                              end if
7:                          end for
8:                      end for
9:                      return r_0^{K+m-1}
```

As an example, given P(16, 8, 6) with the CRC polynomial $x^6+x+1$, the final remainder is:

$$r_8 = v_2 \oplus v_3 \oplus v_8,$$
$$r_9 = v_3 \oplus v_4 \oplus v_9,$$
$$r_{10} = v_0 \oplus v_4 \oplus v_5 \oplus v_{10},$$
$$r_{11} = v_1 \oplus v_5 \oplus v_6 \oplus v_{11},$$
$$r_{12} = v_0 \oplus v_2 \oplus v_6 \oplus v_7 \oplus v_{12},$$
$$r_{13} = v_1 \oplus v_2 \oplus v_7 \oplus v_{13}.$$

The XOR equations can then be transformed to constraints in the second stage. As an example, in a XOR equation $q_1 \oplus q_2 \oplus \ldots \oplus q_L = 0$, if L=3, $q_1 \oplus q_2 \oplus q_3 = 0$, which is equivalent to $q_1 \oplus q_2 = q_3$. In accordance with the node constraint 122 as defined above, the cost function associated with this XOR operation can be defined as $(q_1+q_2-q_3-2v_1)^2$, where 11 is an ancillary variable. In some embodiments, $(q_1+q_2+q_3-2v_1)^2$ can be used instead. Both can be seen as equivalent, because the minimum value of this function (i.e., 0) also leads to $q_1 \oplus q_2 = q_3$. The maximum of $(q_1+q_2+q_3)$ can be observed to be 3. To satisfy $q_1 \oplus q_2 \oplus q_3 = 0$, the number of 1's in q's must be even. To achieve the lowest cost, the maximum of $(q_1+q_2+q_3)$ should be 2, therefore $-2v_1$ can be added as an ancillary variable in the function.

In the case of a general L, the maximum of $(q_1+q_2+\ldots+q_L)$ is L. Assuming $l=[\log_2 L]$, the cost function can be represented by the following:

$$(q_1 + q_2 + \ldots + q_L - 2^l v_l - 2^{l-1} v_{l-1} - \ldots - 4v_2 - 2v_1)^2$$

In the P(16, 8, 6) example above, the CRC constraints can be transformed as follows:

$$(v_2 + v_3 + v_8 - 2v_{14})^2,$$
$$(v_3 + v_4 + v_9 - 2v_{15})^2,$$
$$(v_0 + v_4 + v_5 + v_{10} - 4v_{16} - 2v_{17})^2,$$
$$(v_1 + v_5 + v_6 + v_{11} - 4v_{18} - 2v_{19})^2,$$
$$(v_0 + v_2 + v_6 + v_7 + v_{12} - 4v_{20} - 2v_{21})^2,$$
$$(v_1 + v_2 + v_7 + v_{13} - 4v_{22} - 2v_{23})^2,$$

where $v_i$'s are the CRC ancillary bits for $14 \leq i \leq 23$.

In embodiments using BCE in the receiver constraints 124, not using frozen constraints 126, but using CRC constraints 128, the cost function can be redefined as:

$$f(v_0^{T-1}) = W_N \sum_{P \in T} C_N(P) + W_R \sum_{\forall j} C_R(x_j) + W_C \sum_{Q \in Q} C_C(Q)$$

where Q denotes the set of all CRC constraints 128 as shown above in equation (12) and $W_C$ is the corresponding weight. Since the cost function is still quadratic, it can be transformed into a QUBO form.

With reference to FIG. 1, once the optimization constraints have been instantiated in step 100, a subsequent step 200 can include solving the optimization problem to obtain candidate solutions. Once the variable values have been optimized to minimize (in the exemplary embodiment) the objective function, yielding a best-known candidate solution, the values of the output variables in the best-known candidate solution can be taken as decoded symbols deemed to best approximate the message corresponding to the noisy codeword. Therefore, solving the optimization problem corresponds to decoding the noisy codeword. In some embodiments, the optimization problem is solved using a metaheuristic, reducing limiting the use of computational resources. As examples, when the objective function is transformed into QUBO form, quantum annealing or simulated annealing can be used.

Figure 8:
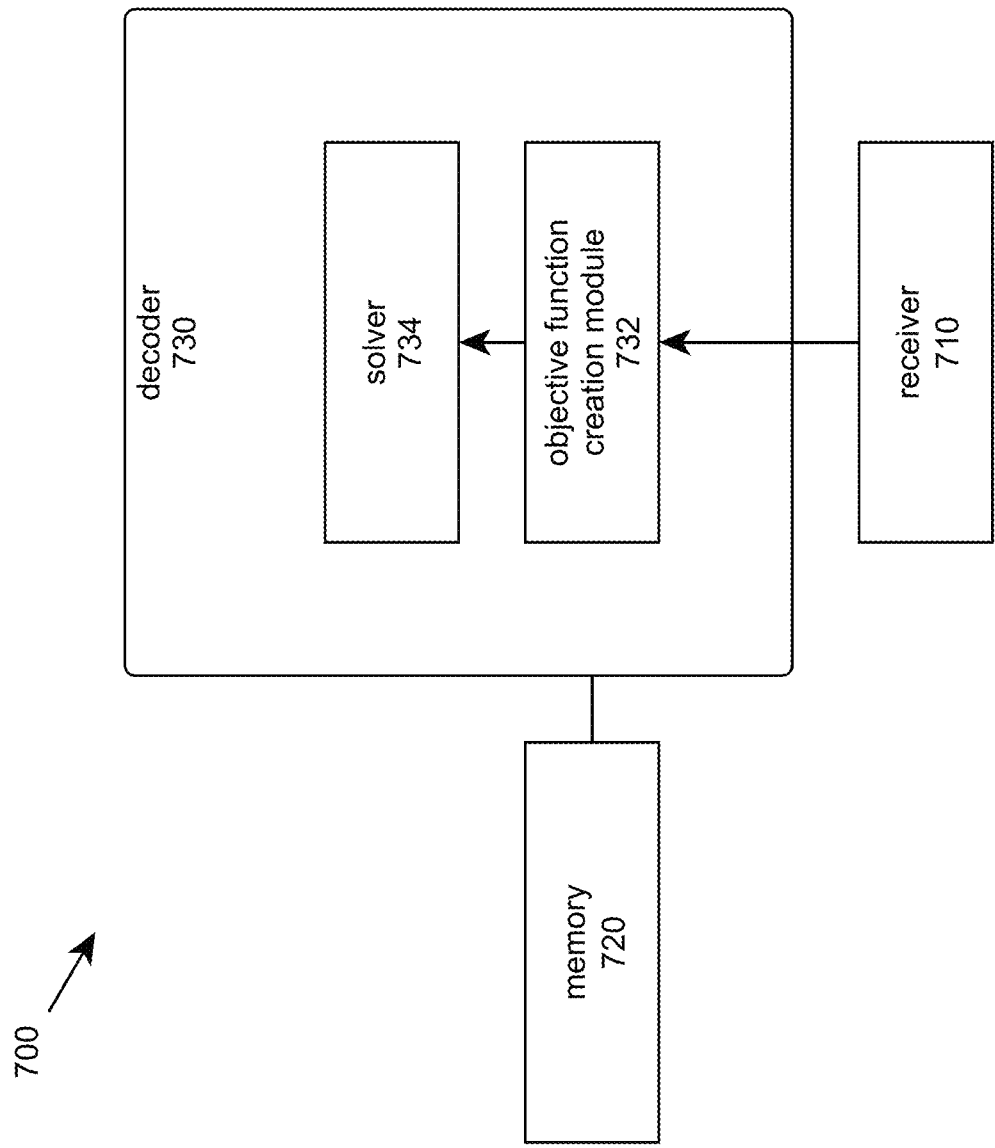
FIG. 8 is a schematic illustrating a system for decoding a noisy codeword, according to an embodiment.

With reference to FIG. 8, an exemplary system 800 for decoding a noisy codeword is shown. Broadly described, system 800 includes a receiver 810, memory 820, and a decoder 830.

The receiver 810 is configured for receiving a noisy codeword that was encoded by an encoder and transmitted through a noisy channel. It can be appreciated that error-correcting codes are frequently used to improve the robustness of telecommunication network communications, for instance in cellular networks. As an example, polar code was chosen to be the standard for the 5G NR radio access technology. In some embodiments, therefore, receiver 810 comprises a radio frequency receiver coupled to a radio antenna and including a demodulator, which can be part of a wireless device such as a cellular phone, configured to receive the noisy codeword from a wireless channel.

The memory 820 is configured to store at least variable values, including the values associated with input variables instantiated with the codeword symbols and with additional main variables and ancillary variables created by the decoder 830.

The decoder 830 is configured to decode the noisy codeword, i.e., to compute a candidate solution including decoded symbols that are predicted to correspond to the input of the encoder. The decoder can partly or wholly be implemented by a purpose-built printed circuit board. The decoder can partly or wholly be implemented on a microcontroller unit, an embedded computer controller, a single-board computer and/or a general-purpose computer including one or more processor configured to execute computer code stored, for instance, in memory 820. The decoder 830 includes at least two modules: an objective function creation module 732 configured to generate an optimization problem based on an objective function including variables, as described above, which, once the function has been optimized correspond to decoded symbols, and a solver 734 configured to solve the optimization problem by optimizing, e.g., minimizing, the objective function, as described above. In some embodiments, the objective function creation module 732 is configured to generate a quadratic unconstrained binary optimization, which the solver 734 is configured to solve using quantum annealing or simulated annealing. In some embodiments, the decoder 830 includes at least one quantum processing unit configured to implement quantum annealing to solve the optimization problem.

Figure 4:
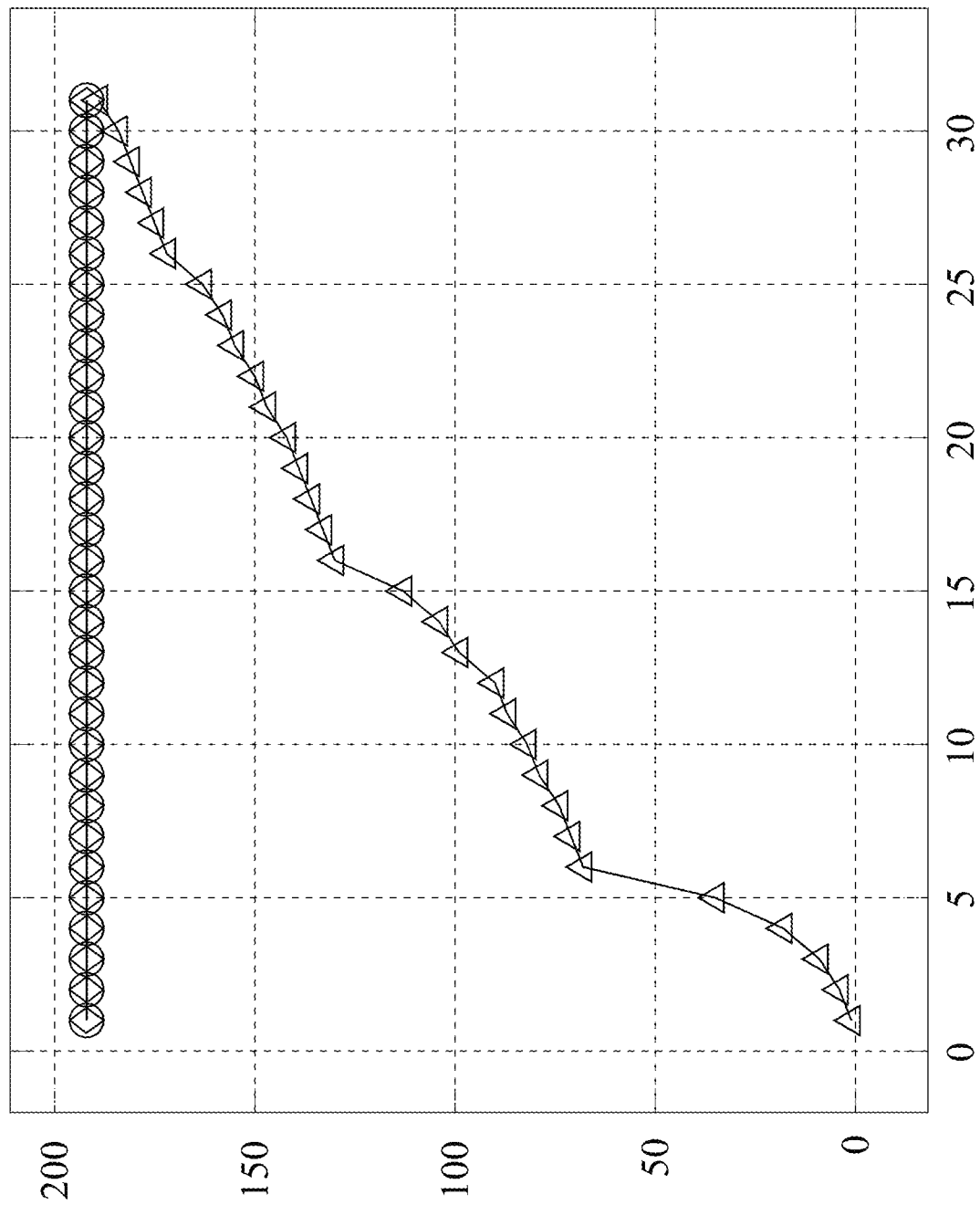
FIG. 4 shows a comparison of the number of variables used in the optimization problem according to three alternative embodiments.
Figure 6B:
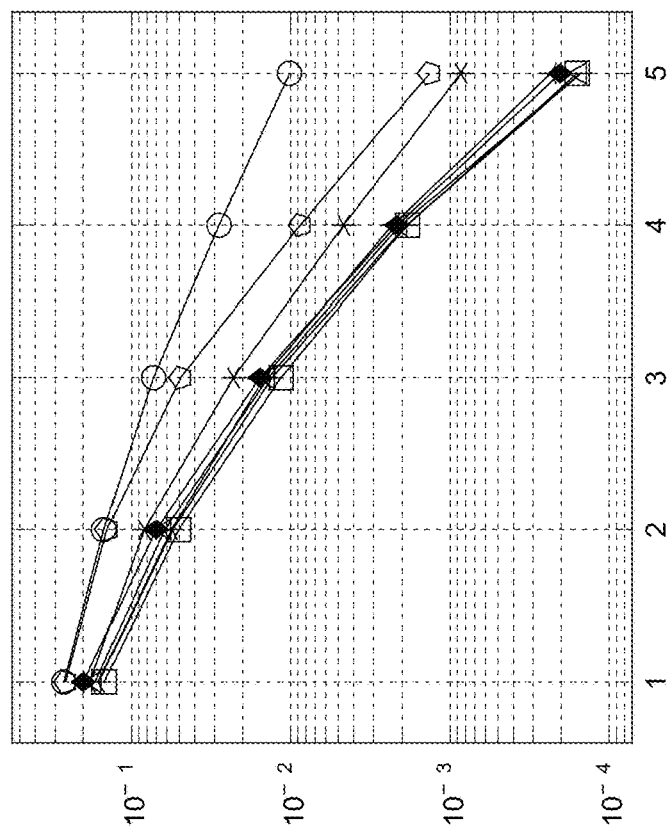
FIGS. 6A to 6F show a comparison of the frame error and bit error rates on additional codeword sizes according to different embodiments and baselines.
Figure 6A:
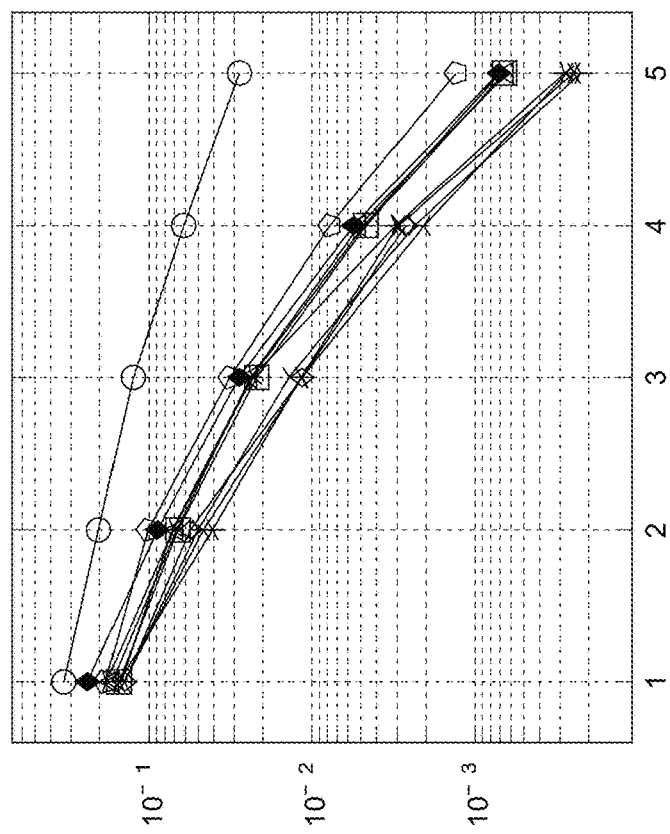

FIG. 4 shows the number of variables with respect to the value K, with N=32, in different embodiments disclosed herein. The "SA" embodiment (circle markers) is provided as a baseline: it corresponds to the solution that uses a distance function as the basis of its receiver constraints 124, that used frozen variables and frozen constraints 126, and that uses no CRC constraints 128. Since SA and XSA (diamond markers) still require frozen bits as variables, both schemes have a fixed required number of variables (i.e., 192 for N=32). The proposed SXSA (diamond markers) reduces the number of variables by removing all the frozen and uninformative variables. The lower the rate is, the more variables could be removed. With P(32, 8), SXSA reduces the number of variables required by SA and XSA by 61.5%. The reduction in variables not only results in the decoder using fewer computational resources but allows the optimizer to focus on flipping the "right" variables. The frame error rate (FER) and bit error rate (BER) of SXSA could achieve a slight performance gain over XSA with the same num_reads, as can be seen in FIG. 6A.

FIGS. 5A, 5B and 6A to 6F provide FER and BER with respect to the signal to noise ratio (here, the ratio of energy per bit to the spectral noise density in dB) comparisons for various embodiments and reference implementations. All decoders are implemented on an Intel E5-2683 processor. Polar codes are constructed by Gaussian approximation at 5 dB. Maximum likelihood (ML) and CRC-aided ML (CA-ML) bounds are simulated by polar sphere decoding. Also provided are successive cancellation list (SCL) and CRC-aided SCL (CA-SCL) decoders, with a list size S as (CA-)SCL-S. An SA decoder based on the cost function design in Kasi et al. was used. SA, XSA, SXSA and CA-SXSA was implemented in Python by the simulated annealing sampler with PyQUBO and dwave-neal libraries. Denote the number of reads as num_reads. Each read is generated by one run of the SA algorithm.

The weights in the cost function in SA optimization need to be adjusted to improve the performance. The weights were initialized randomly and the broken rate of each node constraint 122 and CRC constraints 128 was recorded. If one constraint is violated, the corresponding weight can be increased. If one constraint is not violated at all, the corresponding weight can be decreased to avoid being stuck in a local optimal state. Note that the maximum value of the functions of different CRC Constraints may be different. For example, the maximum of $(v_2+v_3+v_8-2v_{14})^2$ is 9, while the maximum of $(v_0+v_2+v_6+v_7+v_{12}-4v_{20}-2v_{21})^2$ is 25. Therefore, we use $W_{ch}$ to denote the weight for the CRC constraints 128 which could achieve a maximum value of $h^2$.

The FER and BER comparisons of different embodiments on P(16, 8, m), (R=8/16=0.5) are shown in FIGS. 5A and 5B respectively (SA with circle markers, XSA with X markers, SXSA with triangle markers, CA-SXSA with diamond markers, CA-ML bound with upward three-pointed star markers, SC with pentagonal markers, ML bound with square markers, CA-SCL-16 with asterisk markers, and CA-SCL-31 with downward three-pointed star markers; m=6 for CRC-aided decoders). The SA with suggested weights as described above has a 1.5 dB gap to the ML bound at FER=10−2 with num_reads=300, while the proposed XSA achieves near-ML performance with the same num_reads. SC decoding could also achieve near-ML bound.

Figure 6D:
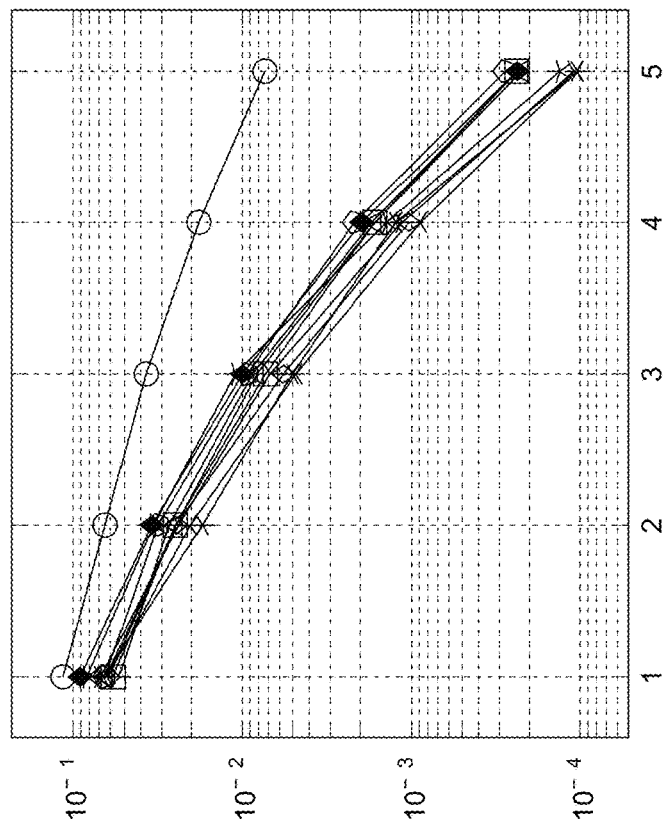

The FER (FIGS. 6A to 6C) and BER (FIGS. 6D to 6F) comparison of different schemes on N=32 with different code rates is illustrated in FIGS. 6A and 6D (K=12), 6B and 6E (K=16), and 6C and 6F (K=26) (SA with circle markers, XSA with filled diamond markers, SXSA with triangle markers, CA-SXSA with diamond markers, CA-ML bound with upward three-pointed star markers, SC with pentagonal markers, SCL-8 with I markers, ML bound with square markers, CA-SCL-16 with five-pointed star markers, CA-SCL-32 with downward three-pointed star markers, and CA-ML bound with m=4 with six-pointed star markers; m=6 for CRC-aided decoders unless indicated otherwise). The num_reads for the SA, XSA, and SXSA are 300 on P(32, 12), and are 103 on P(32, 16) and P(32, 26). The SA has a nearly 2 dB FER gap to the ML bound with low rate and medium rate, and has a 0.6 FER gap on P(32, 26), while the proposed XSA could reach near-ML bound at high SNRs in all three cases. At low SNRs, XSA has a performance loss (e.g., P(32, 26)). This is mainly caused by the weights and num_reads. Setting WN=12.5 is suitable for high SNRs (i.e. 5 dB). If the num_reads increases, the performance will also improve.

Figure 6C:
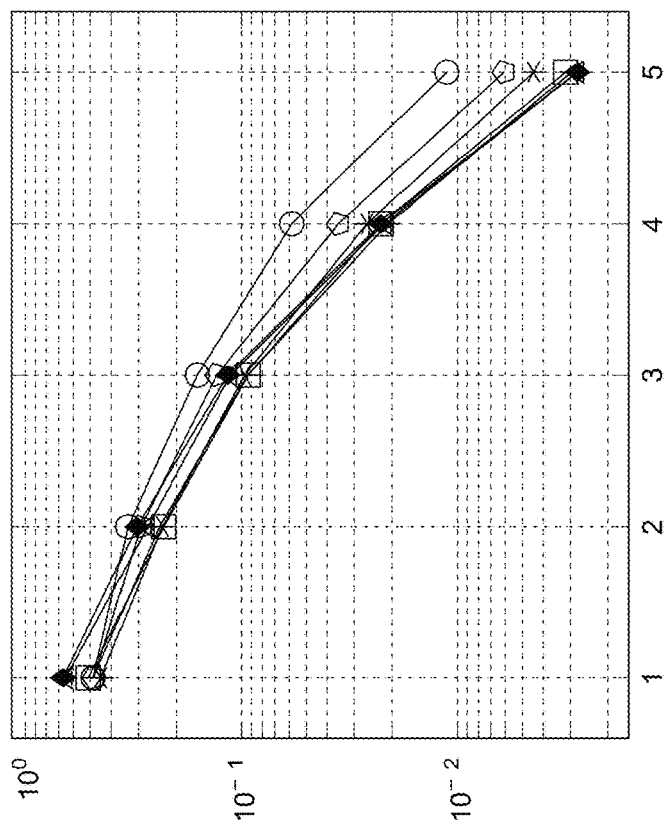
Figure 6F:
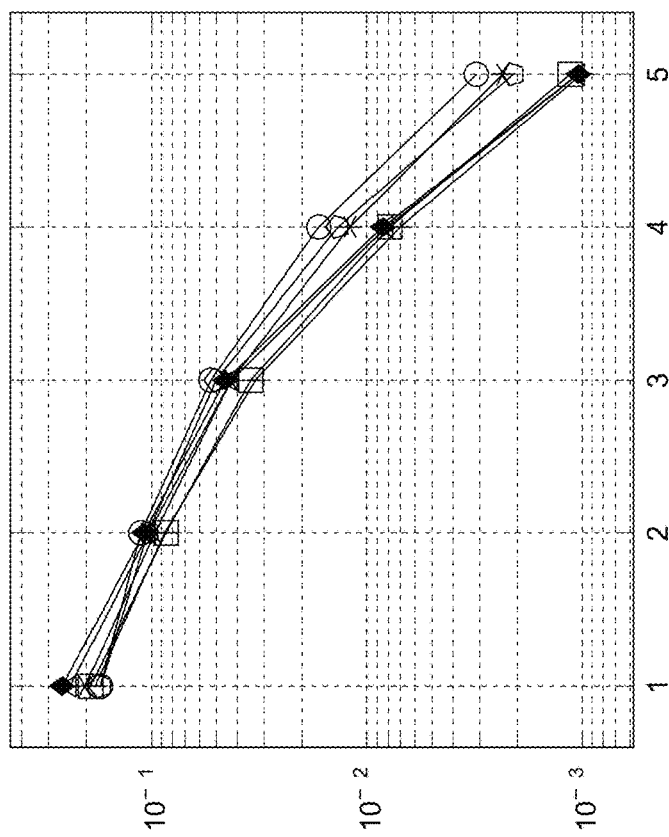
Figure 6E:
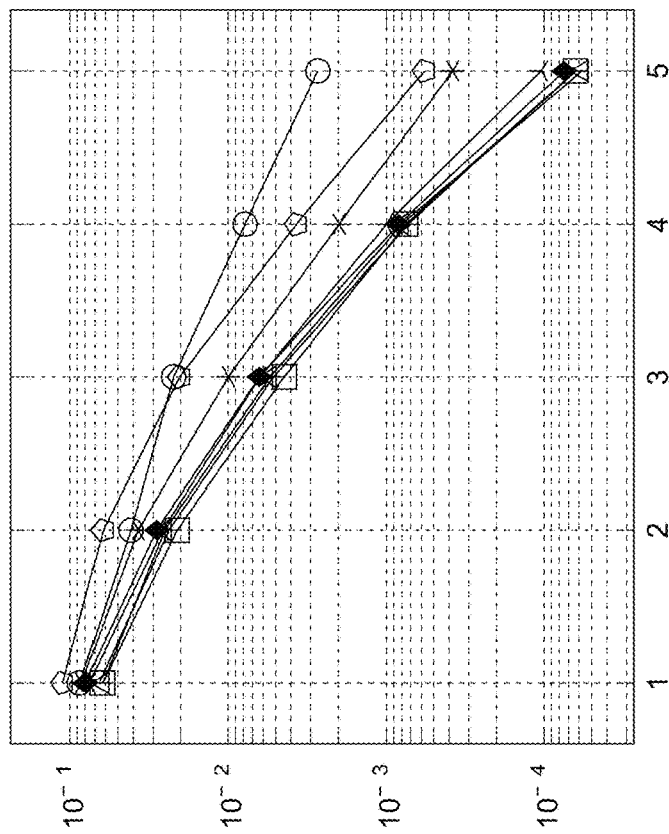

The 4-bits and 6-bits CRC polynomials used in the simulations are: $x^4+x+1$ and $x^6+x+1$, respectively. Note that after adding m CRC bits (m>0), P(N, K, 0) and P(N, K, m) are different codes with the same code rates. The CA-ML bound is not always better than the original ML bound since the redundancy reduces in polar encoding on P(N, K, m). In FIGS. 6(b) and 6(c), we observe that CA-ML bounds on P(32, K, 4) and P(32, K, 6) are worse than the ML bound. In FIGS. 5 and 6(a), the CA-ML bound on P(N, K, 6) achieves a 0.5 dB than the ML bound. Therefore, the proposed CA-SXSA is implemented on these codes to further improve the FER and BER performance. Since the increased CRC variables also bring CRC Constraints and the corresponding weights, CA-SXSA is more complicated than SXSA, which requires a higher num_reads to reach the expected performance. The num_reads for CA-SXSA on P(16, 8, 6) and P(32, 12, 6) are 103 and 104, respectively.

In FIG. 5A, CA-SXSA with $W_N=12$, $W_{c3}=11$, $W_{c4}=10$, $W_{c5}=9$ on P(16, 8, 6) achieves a 0.4 dB FER gain than the ML bound and nearly reaches the CA-ML bound. CA-SXSA also outperforms CA-SCL-16 with a similar performance to CA-SCL-32 and has a 2 dB FER gain than the SA decoder. In FIG. 6A, CA-SXSA with $W_N=12$, $W_{c5}=11$, $W_{c6}=10$, $W_{c7}=9$ still outperforms the ML bound and could reach the CA-ML bound and achieve similar performance to CA-SCL-32. The above analysis indicates that the proposed CA-SXSA could achieve the near CA-ML bound, which is a further improvement on the SA-based polar decoding algorithms.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for decoding a noisy codeword, the noisy codeword comprising a plurality of codeword symbols corresponding to a plurality of input symbols encoded via an encoder and transmitted via a noisy channel, the method comprising:
generating an optimization problem comprising an objective function, the objective function being evaluated according to variables of candidate solutions, said variables comprising:
a plurality of main variables, each corresponding to one of a plurality of nodes in an encoding graph implemented by the encoder, said main variables comprising input variables at output nodes of the encoding graph and output variables at input nodes of the encoding graph, and a plurality of ancillary variables, each corresponding to an additional output of one of a plurality of logical operations in the encoding graph, wherein the objective function comprises an aggregation of constraints, the constraints comprising:

node constraints configured to generate a first cost penalty when the main and ancillary variables of a candidate solution disagree with conditions of the encoding graph implemented by the encoder, and receiver constraints configured to generate a second cost penalty corresponding to a cross-entropy between each codeword symbol and a corresponding one of the input variables; and solving the optimization problem to obtain a candidate solution, wherein the output variables in the candidate solution correspond to decoded symbols.

2. The method of claim 1, wherein the encoder is a polar encoder.

3. The method of claim 1, wherein the input symbols and codeword symbols are binary symbols, and wherein the logical operations are XOR operations.

4. The method of claim 1, wherein the input symbols comprise information symbols and frozen symbols, and the main variables exclude input nodes of the encoding graph that correspond to frozen symbols.

5. The method of claim 4, wherein the main and ancillary variables exclude uninformative nodes at intermediate layers of the encoding graph.

6. The method of claim 1, wherein the input symbols comprise information symbols and frozen symbols, further wherein the objective function additionally comprises frozen constraints configured to generate a third cost penalty when input variables corresponding to frozen symbols are not equal to a predetermined value.

7. The method of claim 1, wherein the input symbols further comprise cyclic redundancy check (CRC) symbols, and the objective function additionally comprises CRC constraints configured to generate a fourth cost penalty when the main and ancillary variables of the candidate solution fail a CRC verification corresponding to a CRC function used to generate the CRC symbols.

8. The method of claim 7, wherein the CRC verification is represented as a plurality of logical operations on the main and ancillary variables, and the CRC constraints correspond to a plurality of constraints that are minimized when the plurality of logical operations are respected.

9. The method of claim 1, wherein the optimization problem is a quadratic unconstrained binary optimization problem.

10. The method of claim 9, wherein solving the optimization problem comprises using one of quantum annealing and simulated annealing.

11. A system for decoding a noisy codeword, the system comprising:

a receiver configured for receiving the noisy codeword, wherein the noisy codeword comprises a plurality of codeword symbols corresponding to a plurality of input symbols encoded via an encoder and transmitted via a noisy channel;

memory for storing variable values; and a decoder comprising:

an objective function creation module configured to:

generate an optimization problem comprising an objective function, the objective function being evaluated according to variables of candidate solutions, said variables comprising:

a plurality of main variables, each corresponding to one of a plurality of nodes in an encoding graph implemented by the encoder, said main variables comprising input variables at output nodes of the encoding graph and output variables at input nodes of the encoding graph, and a plurality of ancillary variables, each corresponding to an additional output of one of a plurality of logical operations in the encoding graph, wherein the objective function comprises an aggregation of constraints, the constraints comprising:

node constraints configured to generate a first cost penalty when the main and ancillary variables of a candidate solution disagree with conditions of the encoding graph implemented by the encoder, and receiver constraints configured to generate a second cost penalty corresponding to a cross-entropy between each codeword symbol and a corresponding one of the input variables; and a solver configured for solving the optimization problem to obtain a candidate solution, wherein the output variables in the candidate solution correspond to decoded symbols.

12. The system of claim 11, wherein the encoder is a polar encoder.

13. The system of claim 11, wherein the input symbols and codeword symbols are binary symbols, and wherein the logical operations are XOR operations.

14. The system of claim 11, wherein the input symbols comprise information symbols and frozen symbols, and wherein the objective function creation module is configured to exclude input nodes of the encoding graph that correspond to frozen symbols from the main variables.

15. The system of claim 14, wherein objective function creation module is configured to exclude uninformative nodes from the main and ancillary variables at intermediate layers of the encoding graph.

16. The system of claim 11, wherein the input symbols comprise information symbols and frozen symbols, and wherein the objective function creation module is configured to generate frozen constraints for aggregation in the objective function, the frozen constraints configured to generate a third cost penalty when input variables corresponding to frozen symbols are not equal to a predetermined value.

17. The system of claim 11, wherein the input symbols further comprise cyclic redundancy check (CRC) symbols, and wherein the objective function creation module is configured to generate CRC constraints for aggregation in the objective function, the CRC constraints configured to generate a fourth cost penalty when the main and ancillary variables of the candidate solution fail a CRC verification corresponding to a CRC function used to generate the CRC symbols.

18. The system of claim 17, wherein the CRC verification is represented as a plurality of logical operations on the main and ancillary variables, and the CRC constraints correspond to a plurality of constraints that are minimized when the plurality of logical operations are respected.

19. The system of claim 11, wherein the optimization problem is a quadratic unconstrained binary optimization problem, and wherein the solver is configured to perform one of quantum annealing and simulated annealing.

20. A non-transitory computer-readable medium storing thereon computer executable instructions for decoding a noisy codeword, the noisy codeword comprising a plurality of codeword symbols corresponding to a plurality of input symbols encoded via an encoder and transmitted via a noisy channel, the instructions, when executed by one or more processors of a computing system, causing the computing system to:
- generate an optimization problem comprising an objective function, the objective function being evaluated according to variables of candidate solutions, said variables comprising:
  - a plurality of main variables, each corresponding to one of a plurality of nodes in an encoding graph implemented by the encoder, said main variables comprising input variables at output nodes of the encoding graph and output variables at input nodes of the encoding graph, and
  - a plurality of ancillary variables, each corresponding to an additional output of one of a plurality of logical operations in the encoding graph,
- wherein the objective function comprises an aggregation of constraints, the constraints comprising:
  - node constraints configured to generate a first cost penalty when the main and ancillary variables of a candidate solution disagree with conditions of the encoding graph implemented by the encoder, and
  - receiver constraints configured to generate a second cost penalty corresponding to a cross-entropy between each codeword symbol and a corresponding one of the input variables; and
- solve the optimization problem to obtain a candidate solution, wherein the output variables in the candidate solution correspond to decoded symbols.

* * * * *